United States Patent
Hou et al.

(10) Patent No.: US 7,460,874 B1
(45) Date of Patent: Dec. 2, 2008

(54) METHOD FOR MONITORING PERFORMANCE OF A MESSAGE-DELIVERY SYSTEM

(75) Inventors: Jiongkuan Hou, Olathe, KS (US); James C. Swift, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 589 days.

(21) Appl. No.: 11/202,739

(22) Filed: Aug. 12, 2005

(51) Int. Cl.
*H04Q 7/20* (2006.01)
*H04Q 7/24* (2006.01)

(52) U.S. Cl. .................. 455/466; 370/229; 370/230

(58) Field of Classification Search .................. None
See application file for complete search history.

(56) References Cited

U.S. PATENT DOCUMENTS

| | | | |
|---|---|---|---|
| 5,781,532 A * | 7/1998 | Watt | 370/236 |
| 6,535,482 B1 * | 3/2003 | Hadi Salim et al. | 370/229 |
| 2003/0009560 A1 * | 1/2003 | Venkitaraman et al. | 709/226 |
| 2003/0179704 A1 * | 9/2003 | Lakkakorpi | 370/230 |
| 2003/0210649 A1 * | 11/2003 | Bondi | 370/229 |
| 2004/0114583 A1 * | 6/2004 | Cetin et al. | 370/360 |
| 2006/0064527 A1 * | 3/2006 | Fisher et al. | 710/200 |

OTHER PUBLICATIONS

U.S. Appl. No. 10/781,609, filed Feb. 18, 2005 entitled "Method and System for Providing Timely Message Delivery".
Lucent Technologies, "Business and Service Optimization Software for VoIP Services," (2004).

* cited by examiner

*Primary Examiner*—Erika A Gary

(57) ABSTRACT

A method for monitoring performance of a message-delivery system, such as an SMS delivery system for instance. According to the method described, key performance metrics will be collected from one or more message-routers and will be monitored over time to determine when a threshold problem condition occurs with the message-delivery system. In response to detecting a threshold problem condition such as (i) a threshold measure of difference in router-input and router-output, (ii) a threshold measure of change in message-queue length, and/or (iii) a threshold measure of message delivery attempts per message, an alert will then be generated, in order to inform network administrators or systems of a potential issue and to allow prompt remedial action to be taken.

19 Claims, 5 Drawing Sheets

METHOD FOR MONITORING PERFORMANCE OF A MESSAGE-DELIVERY SYSTEM

FIELD OF THE INVENTION

The present invention relates to network communications and, more particularly, to message-delivery systems, such as short messaging service (SMS) delivery systems for instance.

BACKGROUND

One of the great advantages of modern telecommunications systems is the ability to quickly and easily send messages (e.g., e-mail, SMS, MMS, SIP, HTTP, or other types of messages) from one location to another. In a typical messaging system, a user wishing to send a message may simply open a messaging application, invoke a new-message function, and enter pertinent data such as one or more message-recipients, a subject line, and message content. Once the user has finished generating the message, the user may then invoke a message-send function, to cause the application to send the message to the designated recipient(s). In turn, each message-recipient may then similarly open a corresponding messaging application and may invoke a message-receive function to receive the message and a message-view function to view the message.

In a usual arrangement, messages transmitted over a network from one point to another will pass through one or more message-routers (also known as message gateways, proxies, intermediaries, or by other names) on their way. Each message-router thus sits within a network communication path between a message-sender and one or more message-recipients, and functions at least in part to receive messages and to output the messages for transmission to one or more destinations.

In many cases, a message-router may function as bridge between different types of network segments and/or between disparate messaging-protocols. Further, a message-router may function as an aggregation point, linking one or more message input paths with a potentially different number of message output paths. To accommodate these or other scenarios, a message-router will typically maintain one or more message-queues for holding messages that await output. As the message-router receives messages, the router may programmatically place each message in a queue, and the router may output messages from the queue for transmission to their respective destinations, on a first-in-first-out basis or in some other manner (such as in message-priority order, for instance).

Numerous examples of messaging systems exist today. One of the more well known, for example, is the short messaging service (SMS) system, which provides for communication of short text messages to and from mobile stations such as cell phones and personal digital assistants (PDAs). In general, the SMS system may allow a person to simply type in a desired text message, indicate the directory number associated with a destination cell phone, and then transmit an SMS message encapsulating the desired text message. The telecommunications network then conveys the text message to the destination mobile station, where the message is typically displayed for receipt by an end-user.

During transmission of an SMS message from sender to recipient, the SMS message will typically traverse a number of message-routers. One such router, for example, is a short message service center (SMSC) (also sometime referred to simply as a message center (MC)), which is a functional entity that stores and forwards SMS messages to their destinations. The store and forward function provides a method of sending short messages to their destination recipient or storing those messages if the recipient is unavailable to receive them. This store and forward function can generally be distinguished from the real-time delivery requirements of voice calls, although SMS messages may be delivered in real time as well.

According to industry standards, an entity that sends or receives an SMS message is known as a short message entity (SME). The SME can be an application that resides on a MS, in which case the SME would be an MS-based SME. Alternatively, the SME can comprise, or reside on, another entity in a wireless or fixed network, i.e., in whether or not part of the wireless communications network. Typically, the SME can be arranged to compose, store, dispose of, act upon, display and/or otherwise manage short messages. It can also perform signaling functions to support other delivery features such as MS location and status queries, and mapping of destination addresses. In general, a typical SMSC can forward messages to an SME, store short messages for later delivery to an unavailable SMEs, apply originating and terminating SMS supplementary services (e.g., intelligent network services) to short messages, and serve other functions.

Each MS-based SME is usually associated with an SMSC known as the "home SMSC" in the MS's home system. Typically, a given SMSC then maintains the mobile identification number (MIN) address information of the MSs that it serves, and the SMSC is addressable by the directory numbers (e.g., telephone numbers, IP addresses, e-mail addresses, etc.) of those MSs for mobile terminated messages. When the SMSC receives a message for one of its MSs, it may then identify the location of the MS and forward the message to the mobile switching center (MSC) that serves that MS, for delivery of the message in turn over an air interface to the MS.

Another type of a message-router that can be used in SMS message communication is an interworking function that bridges between disparate types of transport networks, such as conventional SS7 networks (telephone networks), IP networks (e.g., the Internet), and X.25 networks, for instance. In a typical arrangement, an SMSC or MSC can be programmed as, or coupled with, an interworking function, so as to allow conversion of SMS messages from one form to another and thus to allow communication of SMS messages across disparate network segments.

In this way, for instance, an SMS message generated in an SS7-based network can be conveyed over an IP network to a POP3 e-mail server, which can then convert the message into an Simple Mail Transfer Protocol (SMTP) e-mail message and forward the e-mail message to a designated e-mail recipient (which may be considered a type of SME). As another example, text messages generated and conveyed in an IP network (e.g., by an e-mail client) might be conveyed via the interworking function to an SME in an SS7 network. An Internet Service Provider (ISP) may thus allow an Internet e-mail subscriber to send a text message to a designated MS-based SME referenced by a given directory number, for instance.

Still another type of a message-router that can be used in SMS message communications is a bulk message gateway (BMGW), which functions generally to receive SMS messages and to forward the SMS messages to the appropriate serving SMSCs. A BMGW typically comes into play when the sending-SME does not know the identity of the recipient-SME's SMSC, and/or when the sending-SME seeks to send SMS messages in bulk to numerous SMEs. The BMGW may maintain one or more tables correlating SMSC addresses with directory numbers or other SME identifiers. Upon receipt of an SMS message destined to a particular SME, the BMGW may then consult its table(s) to determine the SMSC that serves the recipient-SME, and the BMGW may then transmit the SMS message to that SMSC, for delivery in turn to the recipient-SME.

In an SMS system, as in other messaging systems, the speed and success of message delivery can greatly impact user-experience. For example, messages that contain time-sensitive content should be delivered promptly, otherwise the messages will become outdated. Further, message senders will expect that their messages will be successfully delivered to the designated message recipients. Consequently, a need exists to ensure proper, expected operation of each message-router that sits within the message communication path.

SUMMARY

The present invention is directed to a method for monitoring performance of a message-delivery system, such as an SMS delivery system for instance. According to the invention, key performance metrics will be collected from one or more message-routers and will be monitored over time to determine when a threshold problem condition occurs with the message-delivery system. In response to detecting a threshold problem condition, an alert will then be generated, so as to inform network administrators or systems of a potential issue and to allow remedial action to be taken, preferably before the issue impacts (or significantly impacts) user-experience.

In one respect, an exemplary embodiment of the invention may thus take the form of a method of monitoring performance of a message-delivery system, where the message-delivery system includes at least one message-router configured to receive messages and to output the messages for transmission to one or more destinations. Such a method may involve detecting a router condition including one or more of the following: (i) a threshold measure of difference between router-input and router-output, (ii) a threshold measure of change in router message-queue length, and (iii) a threshold measure of router-delivery attempts per message. In turn, the method may then involve responsively generating an alert, to indicate a problem with the message-delivery system.

The function of detecting a threshold measure of difference between router-input and router-output may include (a) for each of a plurality of time intervals, measuring a respective difference between a number of messages received into a given message router and a number of messages transmitted out of the given message router and (b) determining that at least one such respective difference meets a predefined threshold. Further, the method may include maintaining in data storage multiple predefined thresholds, each corresponding with a particular time of day (such as a particular time range, e.g., 4:00 p.m. to 7:00 p.m.). The function of determining that at least one respective difference meets a predefined threshold may then involve determining that the respective difference for a given time interval meets the predefined threshold that corresponds with the time of day in which the given time interval falls.

The function of detecting a threshold measure of difference between router-input and router-output can also involve detecting a threshold number of occurrences of threshold differences between router-input and router-output. For instance, the function can involve detecting a threshold number of such occurrences in a row, such as in a series of time intervals. In this or other instances, the time intervals can define a sliding window over time, such that the intervals might overlap with each other in time (e.g., one interval extending from time 0 to time 5, the next extending from time 2.5 to time 7.5, and the next extending from time 5 to time 10.) Alternatively, the time intervals could be discrete intervals, in that they do not overlap with each other. Other sorts of time intervals could be used as well.

The function of detecting a threshold change in router message-queue length may include (a) at predefined periods, measuring a current message-queue length in the at least one message router and determining a respective difference between the current message-queue length and a preceding message-queue length, and (b) determining that at least one such respective difference meets a predefined threshold. Further, the method may again include maintaining in data storage multiple predefined thresholds, each corresponding with a particular time of day. The function of determining that at least one respective difference meets a predefined threshold may then involve determining that the respective difference for a given period (e.g., a current period compared with a preceding period) meets the predefined threshold that corresponds with the time of day in which the given period falls.

The function of detecting a threshold change in router message-queue length can also involve detecting a threshold number of occurrences of threshold differences between current message-queue length and preceding message-queue length. For example, the function can involve detecting the threshold number of occurrences in a row, such as in a series of consecutive periods (again, whether overlapping or discrete).

The function of detecting a threshold measure of router-delivery attempts per message may include (i) determining an average number of message delivery attempts made by the at least one message-router per message, and (ii) determining that the average meets a predefined threshold. For instance, the function may involve monitoring the number of delivery attempts (including re-delivery attempts) made through successful delivery of each message output from the message-router over a period of time, and computing an average number of delivery attempts per message, and determining that the average meets a designated threshold.

The function of generating an alert to indicate a problem with the message-delivery system may involve transmitting a message via a network to a predefined destination. Alternatively, the function may involve otherwise establishing and perhaps presenting an alert, whether audible and/or visible.

Further, in a preferred embodiment, the at least one message-router to which the method applies can include a message-router in an SMS communication path, such as an SMSC or a BMGW for instance. Alternatively, the at least one message-router can include another sort of message-router, possibly for another sort of messaging, such as a message-router used for e-mail messaging or instant messaging for instance. Still further, it should be understood that the method can apply with respect to one or more message-routers. For instance, any of the various thresholds described above can be detected with respect to just a given message-router, such as a given SMSC. Alternatively, any of the various thresholds can be detected with respect to a group of message-routers (e.g., one or more SMSCs, plus one or more BMGWs), thereby providing a more general read on the performance of a message-delivery system.

In another respect, the method of monitoring performance of a message-delivery system can involve analyzing all three of the threshold conditions noted above, to determine whether each such condition is met, and generating an alert if one or more of the threshold conditions is met. More particularly, the method may involve (i) making a determination of whether a threshold measure of difference between router-input and router-output exists, (ii) making a determination of whether a threshold measure of change in router message-queue length exists, (iii) making a determination of whether a threshold measure of router-delivery attempts per message exists, and (iv) generating an alert if one or more of the determinations is positive.

In this regard, as with the embodiment described above, the function of determining whether a threshold measure of difference between router-input and router-output exists can involve (a) for each of a plurality of time intervals, measuring a respective difference between a number of messages received into a given message router and a number of messages transmitted out of the given message router, and (b) determining whether at least one such respective difference meets a predefined threshold.

Similarly, the function of determining whether a threshold measure of change in router message-queue length exists can involve (a) at predefined periods, measuring a current message-queue length in the at least one message router and determining a respective difference between the current message-queue length and a preceding message-queue length, and (b) determining whether a threshold number of such respective differences in a row (e.g., for consecutive periods) each meet a predefined threshold.

Yet similarly, the function of determining whether a threshold measure of router-delivery attempts per message exists can involve (a) determining an average number of message delivery attempts made by the at least one message router per message, and (b) determining whether the average meets a predefined threshold.

Further, as with the embodiment described above, the at least one message-router can include an SMS message-router such as an SMSC or a BMGW, or it can include any other type of message-router now known or later developed.

These as well as other aspects, advantages, and alternatives will become apparent to those of ordinary skill in the art by reading the following detailed description with reference where appropriate to the accompanying drawings. Further, it should be understood that the description provided in this summary and below is intended as an example only.

DETAILED DESCRIPTION

Figure 1:
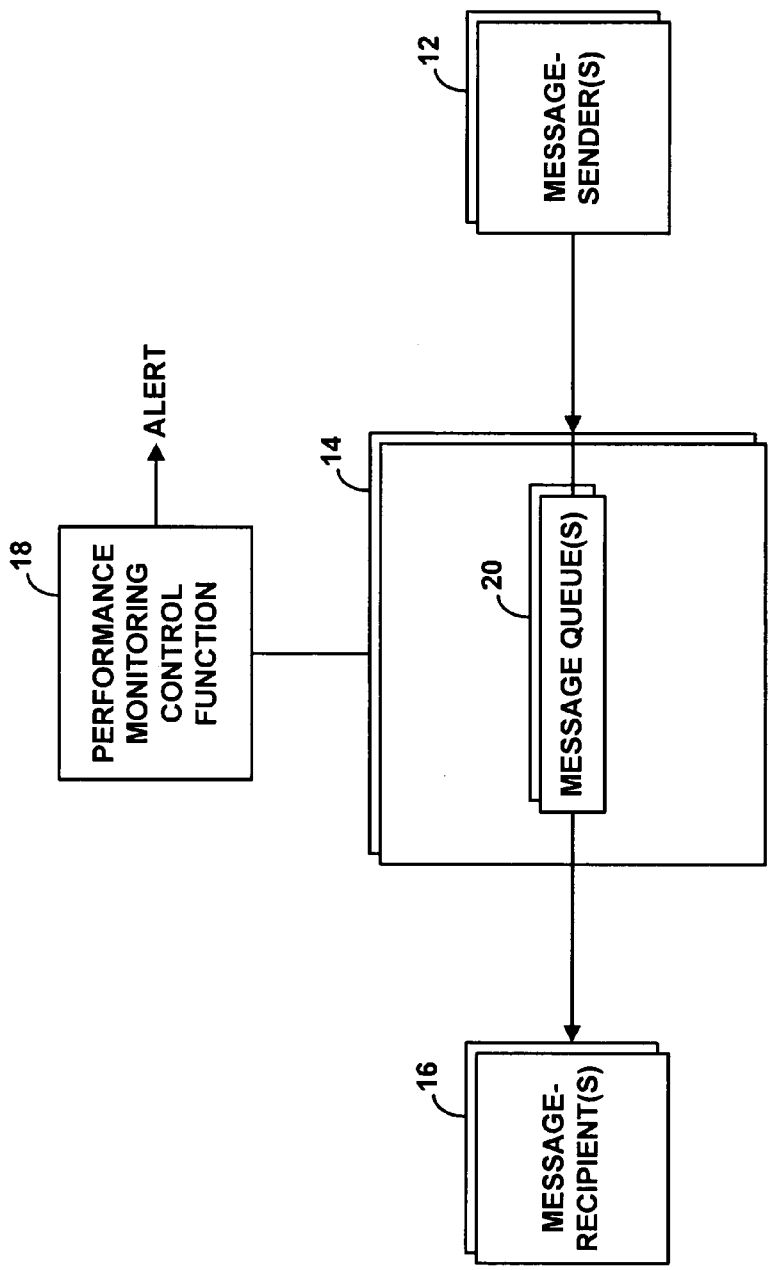
FIG. 1 is a block diagram of an exemplary message-delivery system in which the exemplary embodiment can be implemented.

Referring to the drawings, FIG. 1 is a simplified block diagram depicting an exemplary message-delivery system to which the invention can apply. As a general matter, the message-delivery system includes at least one message-sender 12, at least one message-router 14, and at least one message-recipient 16. In accordance with the exemplary embodiment, a performance monitoring control function 18 is then coupled with the at least one message-router 14 as shown, and/or is integrated with the at least one message-router 14. (By way of example, each message-router can contain its own performance monitoring control function 18 and can report performance monitoring data and/or alerts to a central control function 18.) The control function 18 operates to detect the one or more threshold problem conditions in the manner described herein and to responsively generate an alert, so as to inform one or more network administrators or systems of a potential problem with the message-delivery system.

As shown in FIG. 1, each message-router 14 includes at least one message-queue 20, which functions to hold messages received into the message-router 14 from the message-sender(s) 12 as the messages await output from the message-router 14 for transmission to their respective message-recipient(s) 16. In practice, each message-queue 20 can be defined programmatically as a linked-list or in any other manner within the memory of the message-router 14. Further, a given message-router can have a single message-queue through which all messages pass and/or multiple message-queues defined to manage different groups (e.g., different classes) of messages passing through the message-router. A message-router can be arranged to queue messages in a first-in-first-out basis, in a priority order basis, or in any other manner now known or later developed.

The connections shown in FIG. 1 between message-sender 12 and message-router 14 and between message-router 14 and message-recipient 16 can take various forms and will likely be more complex than those shown. (Similarly, the optional connection shown between message-router 14 and control function 18 may take various forms as well.) Each connection may include any number of intermediate elements and any number of wireless, landline, packet-switched, circuit-switched, and/or other segments. Further, each message-sender 12 and each message-recipient 16 can similarly take various forms. For example, a message-sender 12 or message-recipient 16 may be a wireless communication device such as a cell phone or wirelessly-equipped computer or PDA or a fixed communication device such as a personal computer or landline telephony device. Other examples are possible as well.

As noted above, control function 18 operates to detect one or more threshold problem conditions with the at least one message-router 14 and to responsively generate an alert. Three types of threshold problem conditions are presently contemplated.

A first type of threshold problem condition occurs when the number of messages received by the message-router exceeds the number of messages output by the message-router by an unexpectedly high amount. In this regard, it is to be expected that the some backup of messages will occur in a typical message-router, due to limited router processing power or limited router bandwidth, or due to limited bandwidth on the router's output link(s). However, if the amount of backup becomes unexpectedly high, it may be reasonable to conclude that a problem exists with the message-delivery system. For example, an unexpectedly high backup of messages may occur if the message-router is not working properly or if its output link(s) are not working properly, or if the message-router is being bombarded with rogue messages (e.g., as in a denial-of-service attack). Further, regardless of the reason why an unexpectedly high message backup occurs in a message-router, the unexpectedly high backup can adversely impact user-experience, since the backup can result in delayed or unsuccessful message delivery.

In accordance with the exemplary embodiment, the control function 18 will be arranged to detect a threshold measure of difference between router-input (the number of messages entering the router) and router-output (the number of messages exiting the router). In particular, for each of a series of time intervals, (i) the control function 18 will compute a difference between the number of messages that the message-router received in that time interval and the number of messages that the message-router output in that time interval, and (ii) the control function 18 will determine whether that difference meets a defined threshold.

In one embodiment, the control function 18 may generate an alert in response to determining that the difference between router-input and router-output in just a single time interval meets the threshold. However, recognizing that such an isolated threshold condition could be a mere aberration, the control function 18 will more preferably determine whether the computed difference in each of a designated number of time intervals meets the threshold. For instance, the control function 18 may determine whether the computed difference in each of a designated number of time intervals in a row (i.e., sequentially analyzed intervals) meets the threshold and, if so, may generate an alert.

Further, the threshold that the control function 18 applies when evaluating the difference between router-input and router-output can be a fixed threshold, or it can vary depending on time of day, day of week, or other factors. In this regard, the control function 18 may, for instance, maintain in data storage a set of data that defines different thresholds for different times of day. The thresholds can be set dynamically or otherwise based on observed normal (e.g., average) differences between router-input and router-output at various times of day. For instance, for each observed period of time (e.g., mornings, afternoons, evenings, etc.), the threshold can be set to be a designated percent higher than the observed average difference between router-input and router-output in that period of time, with the percent being a matter of engineering design choice.

As noted above, the time intervals can be defined as a sliding window over time, and the intervals may thus overlap with each other. Alternatively, the time intervals can be discrete, non-overlapping intervals. Further, the time intervals may or may not be contiguous. For instance, the process could be carried out periodically or otherwise, with breaks in time between the time intervals. In any event, the time intervals will preferably be small enough to provide sufficiently quick detection of a potential problem, yet not so small as to unnecessarily consume processing power or other resources. The size of the time intervals is a matter of engineering design choice.

Figure 2:
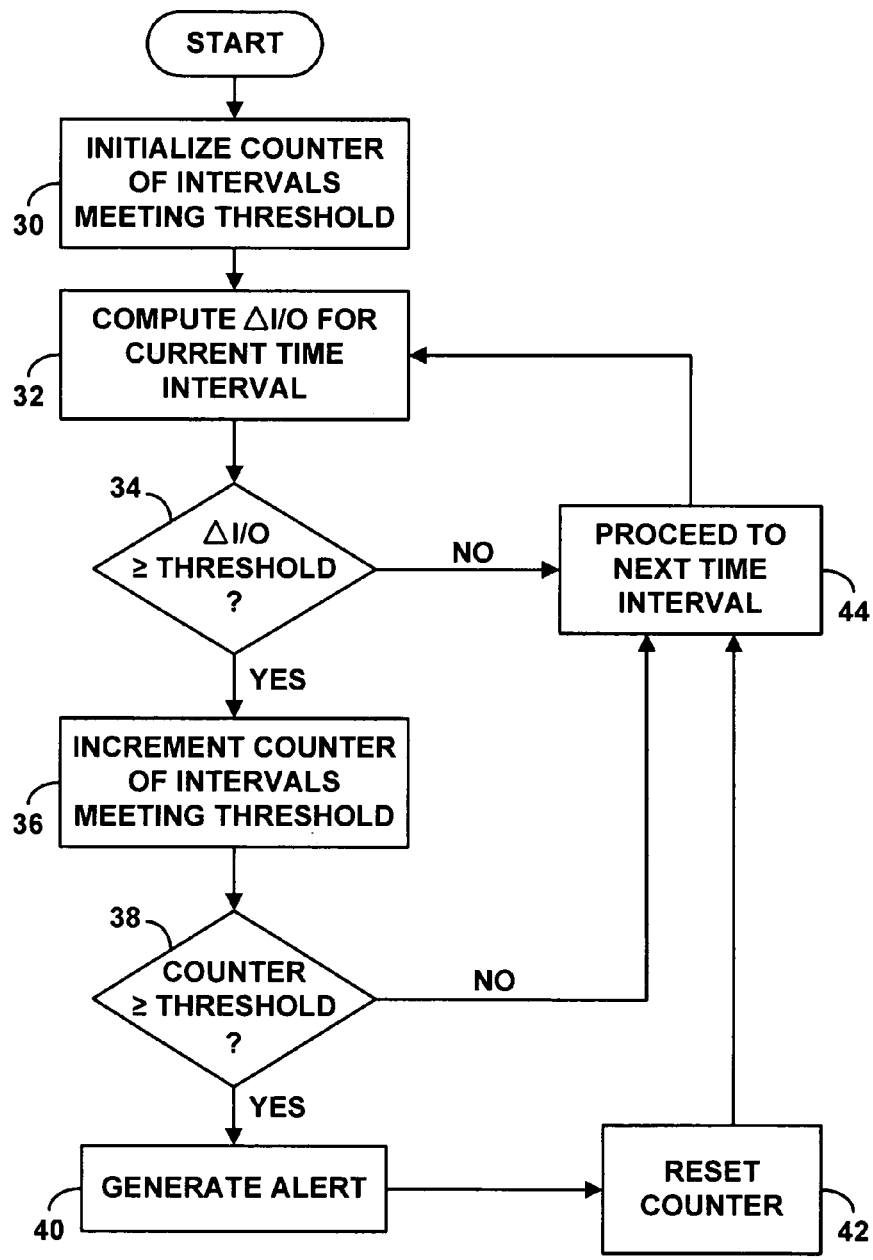
FIG. 2 is a flow chart depicting functions carried out to detect and respond to a threshold difference between router-input and router input.

FIG. 2 depicts an exemplary set of steps involved in detecting and responding to a threshold measure of difference between router-input and router-output. As shown in FIG. 2, at step 30, the control function 18 initializes (e.g., sets to zero) a counter of the number of intervals in which the difference has met the threshold. At step 32, the control function 18 computes a difference between router-input and router-output for a current time interval, i.e., a just completed time interval or a time interval otherwise currently of interest. The control function 18 may do this by measuring the number of messages received into the message-router over the course of the time interval, measuring the number of messages output from the message-router over the course of the time interval, and computing the difference between those two values.

At step 34, the control function 18 then determines whether that computed difference meets a threshold. For instance, when evaluating a time interval that occurs at a given time of day, the control function 18 can refer to its stored data in order to determine the applicable threshold for that time period and can then determine whether the computed difference between router-input and router-output meets (i.e. exceeds, or equals or exceeds) that applicable threshold.

At step 36, if the determination is that the computed difference meets the threshold, then the control function 18 increments the counter of intervals in which the computed difference has met the threshold. In turn, at step 38, the control function 18 determines whether the current count of intervals meets a threshold number, i.e., that the control function 18 has detected a threshold number of time intervals each having a threshold difference between router-input and router-output.

At step 40, if the determination is that the threshold condition has occurred in a threshold number of time intervals, then the control function 18 generates an alert. For instance, the control function 18 may generate and transmit an alert message, such as an SMS message, e-mail message, instant message, or other sort of message to a predefined network administrator address, and/or the control function 18 may generate and transmit an alert message to a system that is arranged to automatically take remedial action. Alternatively or additionally, the control function 18 can light a light, emit an audible alert, and/or generate an alert in some other manner. After generating an alert, at step 42, the control function 18 may then reset the counter of time intervals.

At step 44, the control function 18 next proceeds to evaluate the next time interval, which becomes the current time interval for purposes of step 30. The process may then continue in this manner for each subsequent time interval.

A second type of threshold problem condition occurs when a particular message queue in a message-router becomes unexpectedly full. In this regard, as noted above, it is to be expected that some backup will occur in a typical message-router. However, a relatively sudden and unexpected change in the number of messages in a message-queue may be a sign that a problem exists, and that user-experience may soon be impacted, if it has not been impacted already.

In accordance with the exemplary embodiment, the control function 18 will be arranged to detect a threshold change in router message-queue length (i.e., in the number of messages within a message-queue). In particular, at predefined periods (e.g., periodically), (i) the control function 18 will determine the number of messages within the message-queue at issue and will determine the difference between that number of messages and the number of messages that were in the queue when the preceding measurement was made, and (ii) the control function 18 will determine whether that difference meets a defined threshold.

In one embodiment, the control function 18 may generate an alert in response to detecting that a single change in message-queue length meets the threshold. However, as with the input/output metric above, such an isolated threshold condition could be a mere aberration. Therefore, the control function 18 will more preferably determine whether each of a threshold number of message-queue length measurements (e.g., sequential measurements) meets the threshold and, if so, may generate an alert.

Also as with the input/output metric above, the threshold that the control function 18 applies when evaluating the difference in message-queue length can be a fixed threshold or can vary depending on various factors. For instance, the control function 18 may maintain data that defines different thresholds for different times of day, with the thresholds being set dynamically or otherwise in a manner like that discussed above.

Figure 3:
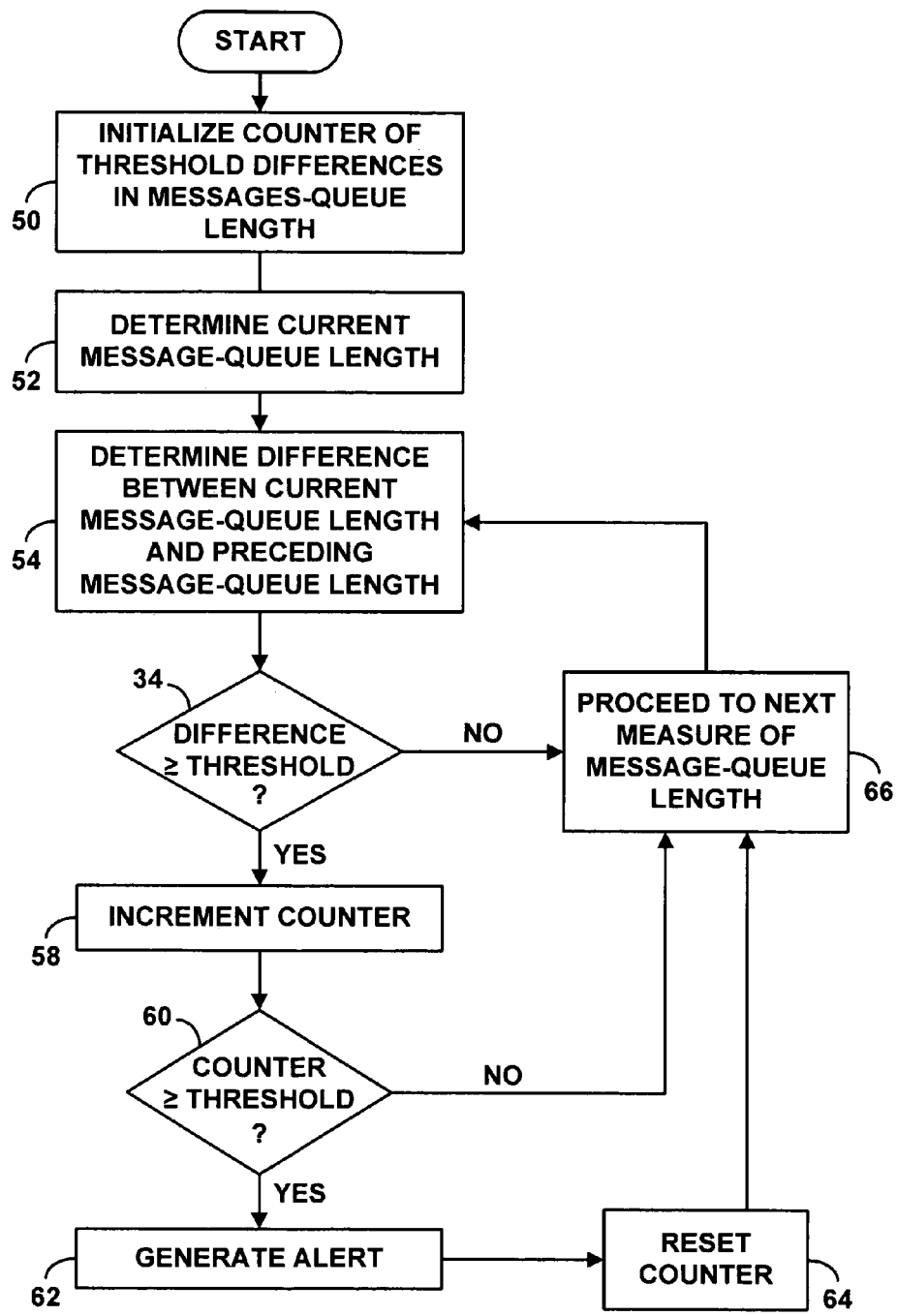
FIG. 3 is a flow chart depicting functions carried out to detect and respond to a threshold change in message-queue length.

FIG. 3 depicts an exemplary set of steps involved in detecting and responding to a threshold measure of difference in message-queue length. As shown in FIG. 3, at step 50, the control function 18 initializes (e.g., sets to zero) a counter of the number of threshold differences in message-queue length. At step 52, the control function determines the current message-queue length. At step 54, the control function 18 then computes a difference between the current message-queue length and a previously determined message-queue length, preferably the message-queue length determined at the immediately preceding period.

At step 56, the control function 18 then determines whether that computed difference meets a threshold. For instance, if the current period falls within a given time of day, the control function 18 can refer to its stored data to determine the applicable threshold for that time of day and can then determine whether the computed difference between the current message-queue length and the preceding message-queue length meets that applicable threshold.

At step 58, if the determination is that the computed difference meets the threshold, then the control function 18 increments the counter of threshold differences in message-queue length. In turn, at step 60, the control function 18 determines whether the current count of threshold differences in message-queue length meets a threshold number, i.e., that the control function 18 has detected a threshold number of changes in message-queue length.

At step 62, if the determination is that the threshold condition has occurred a threshold number of times, then the control function 18 generates an alert. As with the input/output metric discussed above, the function of generating the alert can take various forms. After generating an alert, at step 64, the control function 18 may then reset the counter of threshold differences.

At step 66, the control function 18 next proceeds to a next measure of message queue length, determining the difference between the next measure and the now preceding measure at step 54. The process may then continue in this manner for each subsequent time interval.

A third type of threshold problem condition occurs when a message-router (or, more generally, a message-delivery system) experiences an unexpectedly large number of message-delivery failures. In this regard, certain message-routers may be arranged to receive an acknowledgement for each message they transmit and to re-transmit the message absent receipt of an acknowledgement. An SMSC, for instance, may be arranged to attempt transmission of an SMS message once, to try again 6 minutes later absent an acknowledgment, and to then attempt another such pair of transmissions in another 30 minutes absent acknowledgements. An unexpectedly large number of message-delivery failures can be another sign that a problem exists and that user-experience may soon be impacted, if it has not been impacted already.

In accordance with the exemplary embodiment, the control function 18 will be arranged to detect a threshold measure of router-delivery attempts per message. In particular, the control function 18 may maintain a record of the number of message delivery attempts (MDA) per message and may maintain a running average of those numbers. If the running average every meets a designated threshold, the control function may then responsively generate an alarm. As with the other metrics discussed above, the threshold used for this analysis can be static or can vary with time or other factors.

Figure 4:
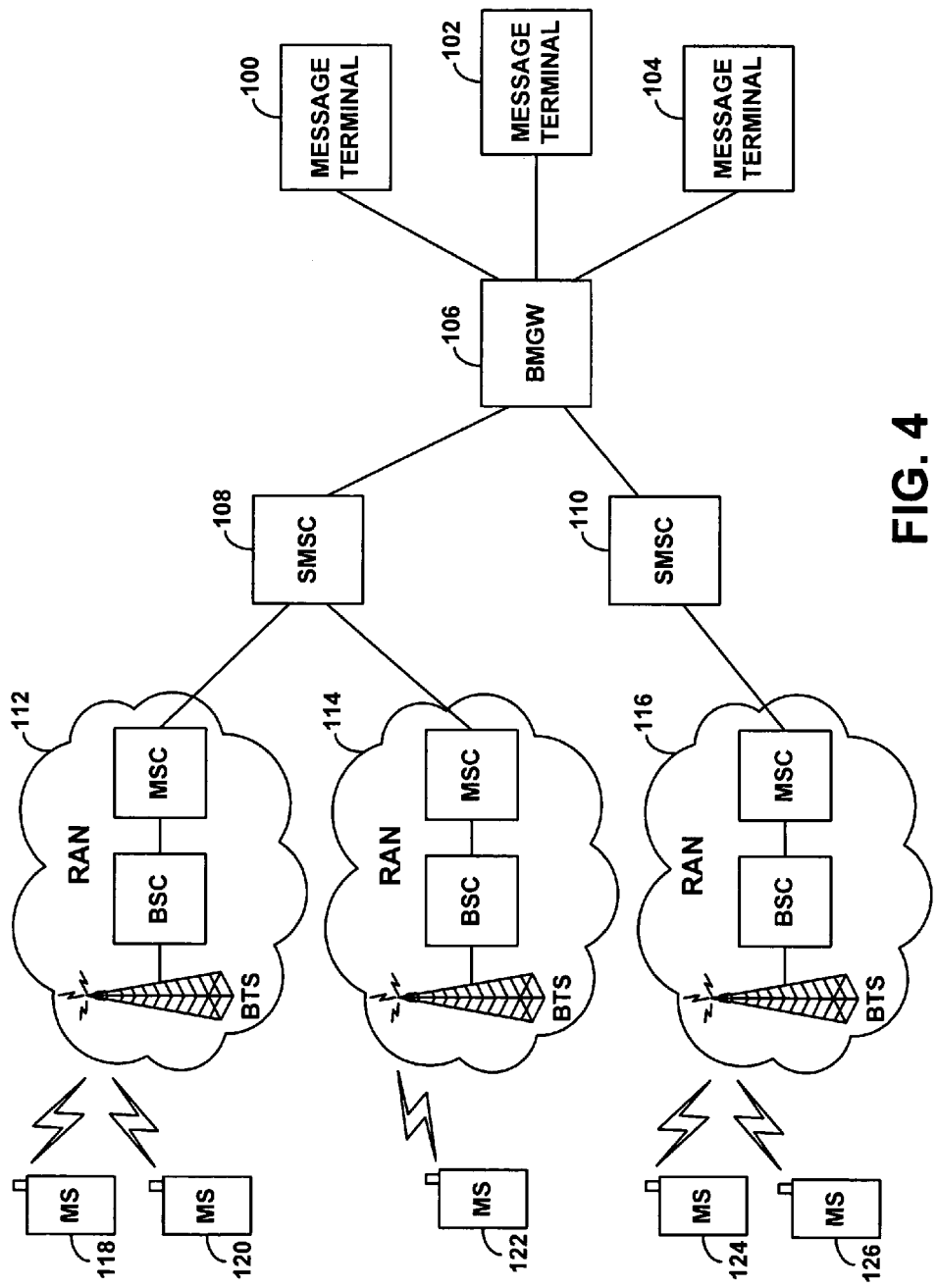
FIG. 4 is a block diagram of an SMS message-delivery system in which the exemplary embodiment can be implemented.

As noted above, the exemplary embodiment can provide for performance monitoring in any of a variety of message-delivery systems, including but not limited to SMS, e-mail, instant messaging, and other systems. FIG. 4 is a simplified block diagram depicting the arrangement of an SMS message-delivery system in which the exemplary embodiment can be implemented by way of example.

As shown in FIG. 4, the example SMS-delivery system includes three message terminals 100, 102, 104, a BMGW 106, two SMSCs 108, 110, three radio access networks 112, 114, 116, and five mobile stations 118, 120, 122, 124, 126. Each radio access network (RAN) is shown including a mobile switching center (MSC), a base station controller (BSC), and a base transceiver station (BTS) that radiates to define one or more wireless coverage areas (e.g., cell sectors) in which the mobile stations operate. It should be understood, of course, that an SMS-delivery system can take forms other than that shown, with elements added, removed, combined, distributed, or otherwise modified.

In practice, as described above, each SMSC functions to receive SMS messages and to forward the SMS messages to the destination serving system, such as the MSC serving the destination MS. By way of example, if MS 118 sends an SMS message to the directory number of MS 122, the SMS message would pass as an IS-41 "SMD-REQ" message over an air interface from MS 118 to RAN 112 and then as an IS-41 "SMDPP" message from RAN 112 to SMSC 108. When possible, SMSC 108 would then send the SMS message as an IS-41 SMDPP message to RAN 114, and RAN 114 would in turn send the SMS message as an IS-41 SMD-REQ message over an air interface to MS 118. Upon successful delivery, MS 118 would then respond with an acknowledgement message to RAN 114, and RAN 114 would in turn respond with an acknowledgement message to SMSC 108. As further noted above, if message delivery is unsuccessful, SMSC 108 may programmatically re-attempt delivery after a period of time, and may continue to do so for a designated number of times.

As further noted above, a BMGW functions to forward SMS messages to appropriate serving SMSCs. For instance, if message terminal 100 sends an SMS message to MS 124, the SMS message may pass as an IS-41 SMDPP message to BMGW 106, BMGW 106 may then perform a database lookup to determine the address of SMSC 110 that serves MS 124, and BMGW 106 may then forward the SMS message as an IS-41 SMDPP message to SMSC 110. SMSC 110 may then send the SMS message as an IS-41 SMDPP message to RAN 116, and RAN 116 would in turn send the SMS message as an IS-41 SMD-REQ message over the air to MS 124. Acknowledgements and any necessary re-transmission could occur as noted above.

With this arrangement, multiple SMS messages will flow through the various message-routers shown, such as through BMGW 106, SMSC 108, and SMSC 110, on their way to their respective destinations. The exemplary embodiment can help to ensure that any problems with operation of these message-routers can be promptly detected and remedied.

Figure 5:
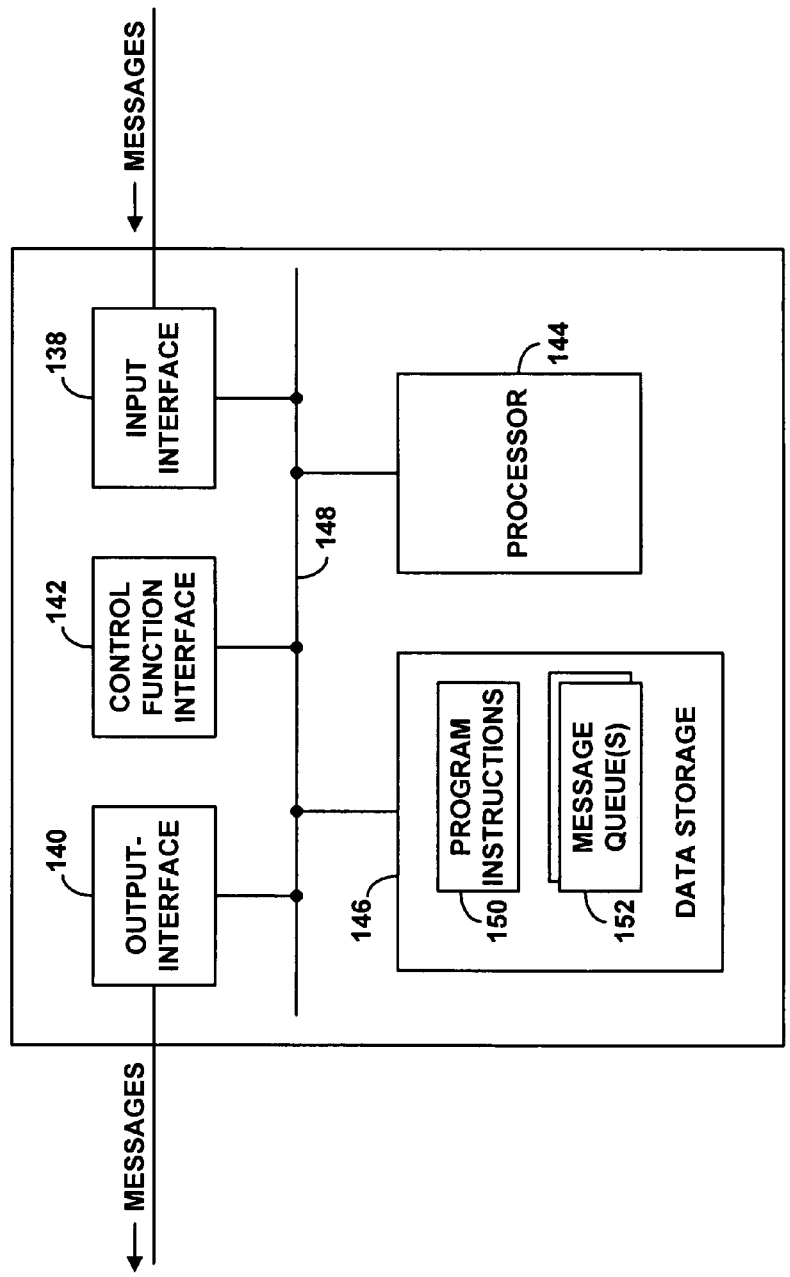
FIG. 5 is a functional block diagram of an exemplary message-router.

FIG. 5 is next a functional block diagram of an exemplary message-router whose performance can be monitored in accordance with the exemplary embodiment. The exemplary message-router could represent BMGW 106, SMSC 108, SMSC 110, or any other message-router in an SMS message-delivery system or other message-delivery system.

As shown in FIG. 5, the exemplary message-router includes an input interface 138, an output interface 140, a control-function interface 142, a processor 144, and data storage 146, all of which may be interconnected by a system bus, network, or other mechanism 148.

The input interface 138 may be a network communication interface, such as an SS7, IP, or other interface, through which the message-router can receive messages, such as SMS messages for instance. The output interface 132 may similarly be a network communication interface through which the message-router can output messages for transmission to their destinations. The control function interface 142, in turn, may be a network communication interface through which the message-router can communicate, e.g., over an IP network, with an external control function and/or through which the message-router can send alert messages. Although these various communication interfaces are shown as separate functions in the figure, it should be understood that they could be integrated together as a common interface that serves various functions.

Processor 144 may include one or more general purpose processors, such as INTEL microprocessors, for instance, and/or one or more special purpose processors. Data storage 146, in turn, contains program instructions 150 executable by processor 144 to carry out various functions described herein, and the data storage 146 is further arranged to hold one or more message queues (as linked-lists or in some other form) 152.

In accordance with the exemplary embodiment, for instance, the program instructions 150 will be executable by the processor 144 to receive messages via input interface 130, place the messages in queue(s) 152, and output the messages in some designated order from queue(s) 152 for transmission via output interface 132 to their respective destinations. Further, the program instructions 150 may themselves define the control function described above, and may thus be executable by the processor 144 to determine whether (i) a threshold measure of difference between router-input and router-output exists, (ii) a threshold measure of change in router message-queue length exists, and/or (iii) a threshold measure of router-delivery attempts per message exists, and, if so, to generate an alert. Alternatively or additionally, the program instructions 150 may be executable by the processor to provide raw performance data (such as measures of router-input, router-output, queue length, and message delivery attempts) to an external control function (not shown) via control function interface 142, whether autonomously (e.g., periodically) or in response to requests from the external control function, so as to allow the external control function to carry out the functions described above.

It should be understood that the performance monitoring functions described above can be carried out with respect to a single message-router and/or with respect to multiple message-routers. For example, when determining whether a threshold measure of difference between router-input and router-output exists, the determination may be whether a current running average of such difference for multiple message-routers meets the threshold. Alternatively, the determination may be whether the difference for a single router meets the threshold.

Similarly, the performance monitoring functions described above can be carried out with respect to a single message-queue and/or with respect to multiple message-queues. For example, when determining whether a threshold change in message-queue length exists, the determination may be whether a current running average of such change for multiple message-queues meets the threshold.

More generally, it should be understood that numerous changes and modifications may be made to the exemplary embodiment described above without departing from the true scope and spirit of the present invention, which is defined by the claims.

What is claimed is:

1. A method of monitoring performance of a message-delivery system, the system comprising at least one message router configured to receive messages and to output the messages for transmission to one or more destinations, the method comprising:

detecting a router condition comprising at least one of (i) a threshold measure of difference between router-input and router-output, (ii) a threshold measure of change in router message-queue length, and (iii) a threshold measure of router-delivery attempts per message; and responsively generating an alert to indicate a problem with the message-delivery system, wherein detecting a threshold measure of difference between router-input and router-output comprises (a) for each of a plurality of time intervals measuring a respective difference between a number of messages received into a given message router and a number of messages transmitted out of the given message router and (b) determining that at least one such respective difference meets a predefined threshold, the method further comprising maintaining in data storage a plurality of predefined thresholds each corresponding with a particular time of day, wherein a given one of the time intervals falls within a given time of day and thus has a given predefined threshold, and wherein determining that at least one respective difference meets a predefined threshold comprises determining for the given time interval that the respective difference meets the given predefined threshold.

2. The method of claim 1, wherein the time intervals cooperatively define a sliding window over time.

3. The method of claim 1, wherein the time intervals are discrete intervals over time.

4. The method of claim 1, wherein detecting a threshold change in router message-queue length comprises:

at predefined periods, measuring a current message-queue length in the at least one message router and determining a respective difference between the current message-queue length and a preceding message-queue length; and determining that at least one such respective difference meets a predefined threshold.

5. The method of claim 1, wherein detecting a threshold measure of router-delivery attempts per message comprises:

determining an average number of message delivery attempts made by the at least one message router per message; and determining that the average meets a predefined threshold.

6. The method of claim 1, wherein generating an alert to indicate a problem with the message-delivery system comprises:

transmitting an alert message via a network to a predefined destination.

7. The method of claim 1, wherein the at least one message router comprises a short message service (SMS) router.

8. The method of claim 7, wherein the SMS router comprises a router selected from the group consisting of a short message service center (SMSC) and a bulk message gateway (BMGW).

9. A method of monitoring performance of a message-delivery system, the system comprising at least one message router configured to receive messages and to output the messages for transmission to one or more destinations, the method comprising:

detecting a router condition comprising at least one of (i) a threshold measure of difference between router-input and router-output, (ii) a threshold measure of change in router message-queue length, and (iii) a threshold measure of router-delivery attempts per message; and responsively generating an alert to indicate a problem with the message-delivery system, wherein detecting a threshold measure of difference between router-input and router-output comprises (a) for each of a plurality of time intervals measuring a respective difference between a number of messages received into a given message router and a number of messages transmitted out of the given message router, and (b) determining that at least one such respective difference meets a predefined threshold, and wherein detecting a threshold measure of difference between router-input and router-output further comprises detecting a threshold number of occurrences of threshold differences between router-input and router-output.

10. The method of claim 9, wherein detecting a threshold number of occurrences of threshold differences between router-input and router-output comprises detecting the threshold number of occurrences in a row.

11. The method of claim 9, wherein the at least one message router comprises a short message service (SMS) router.

12. The method of claim 11, wherein the SMS router comprises a router selected from the group consisting of a short message service center (SMSC) and a bulk message gateway (BMGW).

13. A method of monitoring performance of a message-delivery system, the system comprising at least one message router configured to receive messages and to output the messages for transmission to one or more destinations, the method comprising:

detecting a router condition comprising at least one of (i) a threshold measure of difference between router-input and router-output, (ii) a threshold measure of change in router message-queue length, and (iii) a threshold measure of router-delivery attempts per message; and responsively generating an alert to indicate a problem with the message-delivery system, wherein detecting a threshold change in router message-queue length comprises (a) at predefined periods, measuring a current message-queue length in the at least one message router and determining a respective difference between the current message-queue length and a preceding message-queue length, and (b) determining that at least one such respective difference meets a predefined threshold, the method further comprising maintaining in data storage a plurality of predefined thresholds each corresponding with a particular time of day, wherein a given one of the periods falls within a given time of day and thus has a given predefined threshold, and wherein determining that at least one respective difference meets a predefined threshold comprises determining for the given period that the respective difference meets the given predefined threshold.

14. The method of claim 13, wherein the at least one message router comprises a short message service (SMS) router.

15. The method of claim 14, wherein the SMS router comprises a router selected from the group consisting of a short message service center (SMSC) and a bulk message gateway (BMGW).

16. A method of monitoring performance of a message-delivery system, the system comprising at least one message router configured to receive messages and to output the messages for transmission to one or more destinations the method comprising:

detecting a router condition comprising at least one of (i) a threshold measure of difference between router-input and router-output, (ii) a threshold measure of change in router message-queue length, and (iii) a threshold measure of router-delivery attempts per message; and responsively generating an alert to indicate a problem with the message-delivery system, wherein detecting a threshold change in router message-queue length comprises (a) at predefined periods, measuring a current message-queue length in the at least one message router and determining a respective difference between the current message-queue length and a preceding message-queue length, and (b) determining that at least one such respective difference meets a predefined threshold, and wherein detecting a threshold change in router message-queue length further comprises detecting a threshold number of occurrences of threshold differences between current message-queue length and preceding message-queue length.

17. The method of claim 16, wherein detecting a threshold change in router message-queue length comprises detecting the threshold number of occurrences in a row.

18. The method of claim 16, wherein the at least one message router comprises a short message service (SMS) router.

19. The method of claim 18, wherein the SMS router comprises a router selected from the group consisting of a short message service center (SMSC) and a bulk message gateway (BMGW).

* * * * *